Patented May 24, 1938

2,118,049

UNITED STATES PATENT OFFICE 2,118,049

METHOD OF AMELIORATING ALCOHOLIC LIQUIDS ADAPTED FOR HUMAN CONSUMPTION

Clarence G. Lehr, Baltimore, Md.

No Drawing. Application November 18, 1935,
Serial No. 50,471

7 Claims. (Cl. 99—48)

The object of my invention is the amelioration of beverages, liquors and medicinal preparations containing distilled spirits.

My invention comprises treating a beverage such as whiskey or brandy, or a medicinal preparation such as tincture of digitalis, with a precipitated hydroxide such as ferric hydroxide and a protein material such as gelatine. The treatment of the beverage as indicated has the effect of removing constituents contained in the beverage, or medicinal preparation, which have a harmful effect on the human body. Thus, astringents such as tannic acid are removed and in the case of improved beverages, they may be drunk without causing or aggravating physical disorders. It is a well known fact that many drinkers of alcoholic beverages, particularly whiskies and brandies, suffer from constipation, hemorrhoids and similar disorders, particularly if the individuals are constant drinkers.

Of course, an individual who indulges in distilled liquors such as whiskies, brandies, cognac and the like, is quite apt to later suffer quite distressing effects, such as headaches, nausea, dry mouth and other so called "after effects". I have found that the said "after effects" may be ameliorated or entirely prevented by treating the distilled liquors by my process.

My invention has another application which in some respects is quite apart from the matter of treating whiskies and other distilled liquors, although insofar as the invention is concerned the second modification is related to the first. I refer to the treatment according to my process of various medicinal preparations administered orally, such as tincture of nux vomica, digitalis and others. One striking and wholly unexpected result of my process as applied to an alcoholic solution of digitalis is that the physiological effect is "normalized". By "normalized" I mean to say that each administration or dosage of this substance has its normal or expected effect. It is a well known fact that one or two doses of digitalis when administered to a patient may not have any effect, but when the third dose is given there is a reaction which is the cumulative effect of all three. This cumulative effect is apt to be fatal to the patient. By treating the tincture of digitalis by my process, the physiological effect of the medicine is "normalized", or in other words, each dosage has its normal or expected effect. Other medicinal preparations in the form of tinctures may be similarly treated.

In order to illustrate my invention, the following specific examples are given.

Example I

One to one and one-half ounces of precipitated ferric hydroxide are suspended in one gallon of well aged whiskey or brandy, the said whiskey or brandy is permitted to stand for twenty-four hours, during which time the suspension is stirred frequently. Such a treatment of the liquor will hereinafter be embraced in the expression "a thorough treatment". Then the ferric hydroxide is removed by filtration, centrifuging, sedimentation or any other suitable process.

Example II

The same procedure as outlined in Example I may be followed, except that one-half to one ounce of gelatine may be added with the ferric hydroxide, the gelatine assisting in causing deflocculation and settling of the substances removed by the ferric hydroxide.

Example III

Pack 100 grams of finely powdered digitalis leaves in a cylindrical percolator provided with a stop-cock, and arranged with a cover suitable for volatile liquids, macerate for twenty-four hours with purified petroleum benzine, percolate slowly until a few drops of the percolate evaporated from white filter paper leaves no greasy stain. Reject the benzine percolate. Remove the drug from the percolator and expose it to the air until all odor of benzine is no longer noticeable. Pack firmly again in a percolator and use four volumes of alcohol and one volume of water as a menstruum until 1,000 c. c. are collected, add 100 grams desiccated ferric hydroxide and 40 grams of granulated gelatine, agitate occasionally for twelve hours, let stand over night and filter, adjust the finished tincture to conform to the U. S. P. Biological Standard, using the same menstruum as a diluent.

The theory of operation of my invention has not been definitely established, but I have reason to believe that tannins and tannic acid are removed, thus rendering the product more palatable, less astringent and less injurious; and in case of tinctures of digitalis, nux vomica and others, removing certain constituents which prevent their normal or expected physiological action.

For best results freshly precipitated ferric hydroxide and gelatine should be used, but other heavy metallic hydoxides, particularly metallic hydroxides in the eighth group of the Periodic System may be used, and also other proteins such as casein, isinglass and the like may be used in place of gelatine.

I claim:

1. The process of ameliorating the physiological effect of distilled alcoholic beverages by removing tannins and similar astringent substances, comprising treating said substances with a precipitated heavy metal hydroxide and thereby causing separation of said astringent substances from said beverages.

2. The process as set forth in claim 1, in which gelatine is added to the liquid with the metallic hydroxide.

3. The process of ameliorating distilled alcoholic liquor which comprises treating said liquor with precipitated ferric hydroxide.

4. The process as set forth in claim 3 in which gelatine is added to the liquor with the ferric hydroxide.

5. An improved well aged distilled alcoholic liquor, which is substantially free from those astringent and harmful constituents as are removable by a thorough treatment of said liquor with precipitated ferric hydroxide, and subsequent filtration.

6. A normalized tincture of a medicinal agent which is substantially free from those harmful normal constituents of such tinctures as are removable by a thorough treatment of such tincture with precipitated ferric hydroxide, and subsequent filtration.

7. A process of improving an alcoholic liquid selected from the herein described group which consists of alcoholic liquors and medicinal tinctures, which comprises treating such a liquid with precipitated ferric hydroxide.

CLARENCE G. LEHR.